(12) United States Patent
Do

(10) Patent No.: US 10,349,211 B1
(45) Date of Patent: Jul. 9, 2019

(54) MOBILE LOCATION SECURITY SYSTEM

(71) Applicant: Avast Software s.r.o., Prague (CZ)

(72) Inventor: Juyong Do, Cupertino, CA (US)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/024,839

(22) Filed: Jun. 30, 2018

(51) Int. Cl.
*H04W 4/02* (2018.01)
*H04L 29/06* (2006.01)
*H04W 4/021* (2018.01)
*H04W 4/029* (2018.01)

(52) U.S. Cl.
CPC ......... *H04W 4/022* (2013.01); *H04L 63/0421* (2013.01); *H04W 4/027* (2013.01); *H04W 4/029* (2018.02)

(58) Field of Classification Search
CPC ... H04M 1/72572; H04W 4/023; H04W 4/02; H04W 4/021; H04W 4/025; H04W 4/029; G06F 17/30241; G06F 17/30259; G01S 5/14; H04L 63/0421
See application file for complete search history.

(56) References Cited

U.S. PATENT DOCUMENTS

| | | | |
|---|---|---|---|
| 2010/0211300 A1* | 8/2010 | Jaffe | G08G 1/0104 701/119 |
| 2013/0217419 A1* | 8/2013 | Jodlauk | H04W 4/021 455/456.3 |
| 2016/0189548 A1* | 6/2016 | Thurling | G08G 5/0013 701/3 |
| 2018/0199156 A1* | 7/2018 | Gandhi | H04W 4/06 |

* cited by examiner

*Primary Examiner* — Nizar N Sivji
(74) *Attorney, Agent, or Firm* — Dovas Law, P.C.

(57) ABSTRACT

A system and method is provided for sharing mobile device location information. The method includes receiving signals by a mobile device and determining by the mobile device a first location of the mobile device at a first time based on the signals received by the mobile device. Time data is accessed by the mobile device and the mobile device determines based on the time data that the first time is in a first time window. The first location is transmitted to a particular user device at least responsive to the first time being in the first time window. The mobile device determines a second location of the mobile device at a second time based on the signals received by the mobile device. A first error is applied to the second location at least responsive to the determining of the second location at the second time, and the second location is transmitted including the first error to the particular user device.

13 Claims, 8 Drawing Sheets

MOBILE LOCATION SECURITY SYSTEM

FIELD OF INVENTION

The invention relates generally to location determining systems, and more particularly to mobile communication devices implementing location determining systems.

BACKGROUND

Mobile communication devices such as smart phones typically support location determining, particularly via Global Positioning System ("GPS") hardware incorporated therein. Applications executed on mobile communication devices facilitate the sharing of location information with other users. Thanks to GPS and other location technologies enabling ubiquitous location, users can now enjoy always-on location information from wherever they go and share this information with family and friends.

Despite the benefits of location sharing, such sharing can expose details of a device user's life which a user may desire to remain private, for example places visited and the amount of time a user resides in a particular place. Maintaining the security of this location information is important for the privacy and safety of the mobile communication device user. One known manner of maintaining the security of location information on a mobile communication device is to disable location sharing features or to render location sharing unavailable to particular contacts. This inflexible approach to protecting location privacy may not be suitable for many device users.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided for sharing mobile device location information. The method includes receiving signals by a mobile device and determining by the mobile device a first location of the mobile device at a first time based on the signals received by the mobile device. Time data is accessed by the mobile device and the mobile device determines based on the time data that the first time is in a first time window. The first location is transmitted to a particular user device at least responsive to the first time being in the first time window. The mobile device determines a second location of the mobile device at a second time based on the signals received by the mobile device. A first error is applied to the second location at least responsive to the determining of the second location at the second time, and the second location is transmitted including the first error to the particular user device.

A further location sharing method is provided including receiving first signals by a first mobile device and determining by the first mobile device a location of the first mobile device based on the first signals received by the first mobile device. The first mobile device transmits the location of the first mobile device to a computing system via a network. A second mobile device receives second signals, and the second mobile device determines a location of the second mobile device based on the second signals received by the second mobile device. The second mobile device transmits the location of the second mobile device to the computing system via the network, and the computing system receives the location of the first mobile device and the location of the second mobile device. The computing system further receives from one or more of the first mobile device, the second mobile device, or a third party system an indication of a first access point connected to the first mobile device and a second access point connected to the second mobile device. The location of the first mobile device is cross-referenced with the indication of the first access point to validate the location of the first mobile device, and the location of the second mobile device is cross-referenced with the indication of the second access point to validate the location of the second mobile device. The location of the first mobile device is transmitted to the second mobile device based at least on the validating of the location of the second mobile device, and the location of the second mobile device is transmitted to the first mobile device at least based on the validating of the location of the first mobile device.

A further location sharing method is provided including tracking location of a mobile device over a particular time period. A particular trajectory is determined based on the tracking of the location, the particular trajectory comprising geographic coordinates and timestamps of the geographic coordinates. The geographic coordinates of the particular trajectory are transmitted to the particular device in sequence and at intervals defined by the timestamps to create an artificial replay of the particular trajectory.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
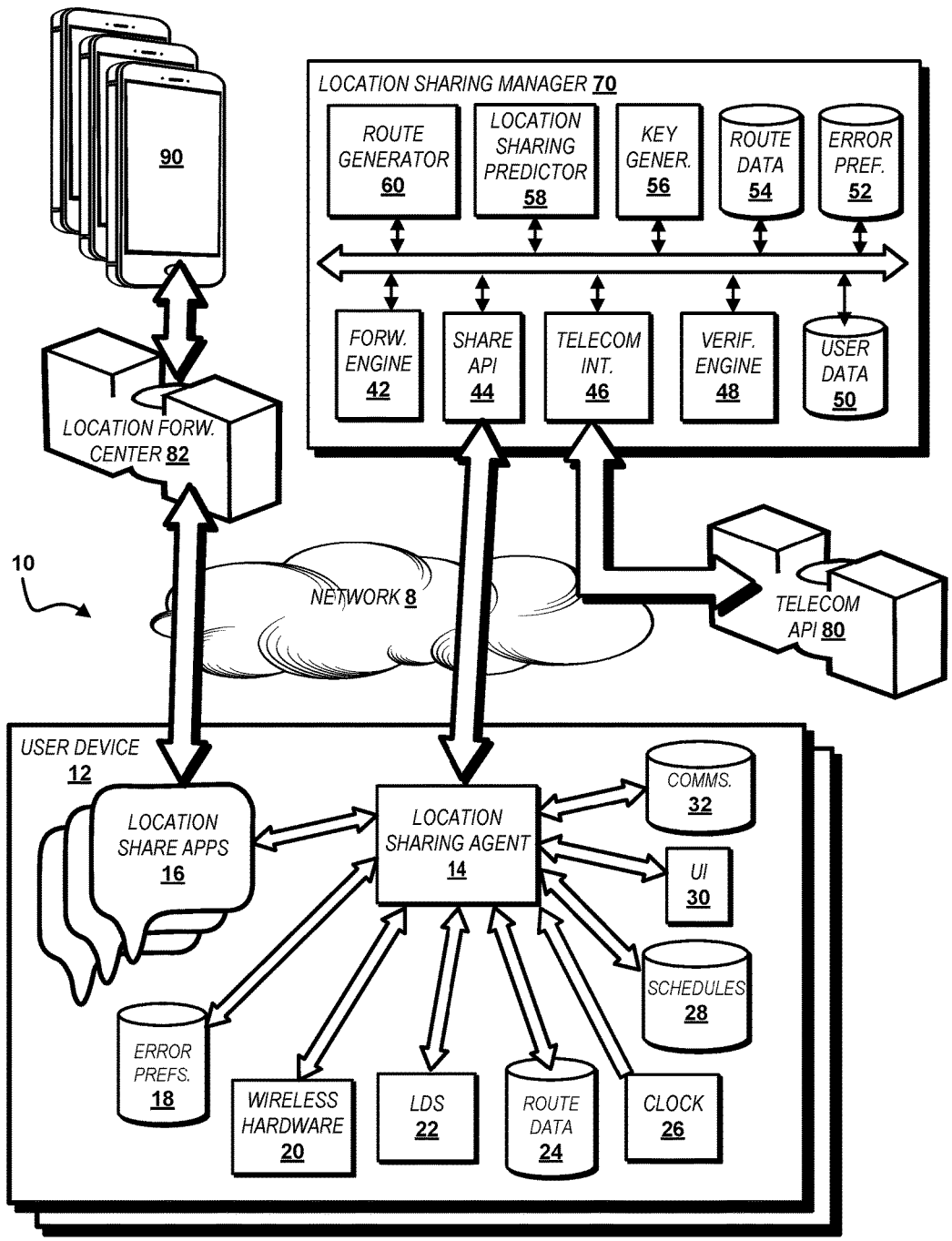
FIG. 1 shows a system including a user device and processor-enabled location sharing manager enabling particular location sharing methods according to the illustrative embodiments.

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Referring to FIG. 1, a system 10 for facilitating sharing of mobile device location information is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks. The system 10 facilitates the balancing of location sharing and location privacy, enabling a user's choice over when, where, how and with whom to share location so that both location sharing and location privacy can be achieved simultaneously.

A mobile communication device 12, for convenience of description termed the "user device 12", operates in the network 8. The user device 12 can include for example a smart phone or other cellular enabled mobile device configured to operate on a wireless telecommunications network. Alternatively, the user device 12 can include a personal computer, tablet device, or other computing device configured for determining its location. In addition to components enabling data processing and wireless communication, the user device 12 includes a location determination system ("LDS") 22, for example hardware including global positioning system ("GPS") receiver, from which a location sharing agent ("sharing agent") 14 gathers data used for determining location of the user device 12. A user operates the user device 12 with the sharing agent 14 active. Software and/or hardware residing on the user device 12 enables the sharing agent 14 to monitor and gather location data determined or accessed by the user device 12.

The user device 12 transmits and receives location information using one or more location sharing applications 16. The location sharing applications 16 can include messaging functionality for implementing location sharing such as Short Message Service ("SMS") messaging or other messaging protocol, for example via 3G/4G/5G cellular protocols, WiFi™ protocol or TCP/IP through the Internet. A message forwarding center 82, for example a Short Message Service Center ("SMSC") is configured to forward location and other messages between particular user devices 12 or between a user device 12 and other communication devices 90, which may or may not execute a sharing agent 14, and which can connect to the message forwarding center 82, for example via GSM wireless protocol or TCP/IP through the Internet.

The sharing agent 14 can be configured as a standalone application executable by a processor of the user device 12 in communication with the location sharing application 16. Alternatively, the sharing agent 14 can be provided as a processor-implemented add-on application integral with the location sharing application 16. Moreover, the sharing agent 14 can alternatively enable a standalone location sharing application, for example for communicating with other location sharing agents 14 executed on other user devices 12.

The system 10 further includes a location sharing manager ("sharing manager") 70 used for authenticating user devices 12, aggregating device location data, and forwarding shared location information. The sharing manager 70 includes a location forwarding engine 42, a location sharing application program interface (API) 44, a telecom interface 46, a verification engine 48, a user datastore 50, an error preferences datastore 52, a route datastore 54, a key generator 56, a location sharing predictor 58, and a route generator 60. The sharing manager 70 can be implemented on one or more network-connectable processor-enabled computing systems, for example in a peer-to-peer configuration, and need not be implemented on a single system at a single location. The sharing manager 70 is configured for communication via the communications network 8 with other network-connectable computing systems including the user devices 12 and a telecommunication carrier system implementing a location API ("Telecom API") 80 for disseminating mobile device location information. Alternatively, the sharing manager 70 or one or more components thereof can be executed on the user device 12 or other system.

The sharing agent 14 enables a user to enter location sharing permissions via a user interface 30 of the user device 12, including for example a touch screen, keyboard, or audio input device. The location sharing permissions define what location information is rendered available to particular parties at particular times ("time windows") and at particular locations ("space windows") of the user device 12. A user of the user device 12 can for example allow location sharing from 10:00 AM to 5:00 PM, Monday through Friday, when the LDS 22 determines the user device is within 1 km of a route from a specified home location to a specified office location. The user can further for example specify enabling location sharing from 12:00 PM to 8:00 PM Saturday and Sunday when the user device 12 is within 10 km from a specified home location, and the user can specify no location sharing during a specified vacation time period, except with designated location requesters (e.g., family members). The user of the user device 12 can designate different permission levels corresponding to different time and space windows for a contact which requests location sharing with the user for example via a location sharing application 16 or the sharing API 44. Further, different accuracy levels can be user-designated or automatically applied to different time windows and space windows. Accuracy can be adjusted by adding artificial errors to location data, which errors can be stored in the error preferences datastore 18 on the user device 12 or the error preferences datastore 52 of the sharing manager 70, and which errors can be applied to location data from the LDS 22 by the sharing agent 14. Table 1 below shows exemplary time-space grids 0, 1, 2 with corresponding time windows, space windows, permission levels, and accuracies. Time-space grids can be stored in the user datastore 50 on the sharing manager 70 or in the schedules datastore 28 on the user device 12. The values of table 1 can for example be specified by a user of the user device 12 through a user interface 30 via the sharing agent 14. The sharing agent 14 can implement the controls directly in the situation where the sharing agent 14 functions as a location sharing application, or alternatively the sharing agent 14 can provide appropriate controls over the location sharing applications 16.

TABLE 1

| Grid | Time window | Space window | Permission level | Accuracy |
|---|---|---|---|---|
| 0 | 10 AM-5 PM, Mon-Fri | Within 1 km of route from home to office | All contacts | High (best accuracy available) |
| 1 | 12 PM-8 PM, Sat-Sun | Within 10 km of home | Level 2 and level 1 contacts (e.g., friends and family) | Medium (e.g., 100 m accuracy by adding artificial errors) |
| 2 | Vacation | N/A | Level 1 contacts only (e.g., family) | Low (e.g., 1 km accuracy by adding artificial errors) |
| ... | | | | |

In another example implementation a teenage son may not want to be location tracked by his parents all of the time, but would like to be tracked by his girlfriend all of the time. To assure his parents, the teenage son through the sharing agent 14 of the user device 12 enables sharing of location with an accuracy of 5 km (close enough to make his parents feel safe, but not close enough to allow them to pinpoint his location). However, the teenage son enables the sharing of location within an accuracy of 10 meters with his girlfriend. This selective customized location sharing balances the needs of location sharing and privacy per relationship.

The sharing agent 14 can further auto-generate time-space grids such as shown in Table 1 based on prior location sharing history, for example automatically cluster learn a time-space grid with similar location sharing historical patterns based on machine learning clustering algorithms. The sharing agent 14 can further suggest learned time-space grids to a user via the user interface 30 for confirming and enforcing a location sharing rule to simplify and accelerate location sharing rule processes.

The sharing agent 14 installed on a user device 12 is further configured to enable location sharing with other user devices 12 which are determined to be trusted. User devices 12 are trusted when mutual location sharing is enabled. The sharing agent 14 provides via the sharing API 44 location data of a user device 12 to the verification engine 48 of the sharing manager 70. The verification engine 48 verifies the location of the user device 12 based on location information from at least two location sources or at least two location protocols. Location information can include for example location determined by the LDS 22 based on GPS measurements, determined cell tower identifiers or wireless access point identifiers (e.g., WiFi router identifiers) based on signals received by wireless hardware 20 of the user device 12, or positions estimated based on such cell tower identifiers or wireless access point identifiers. Location information of a user device 12 can further be received via the telecom interface 46 from a telecommunication carrier system implementing the telecom API 80 providing authorization is granted by the user of the user device 12. When the verification engine 48 has verified for two particular user devices 12 that location sharing is enabled and that the location is accurate based on at least two location sources or protocols, location sharing is enabled. The location sharing of the two user devices 12 can be enabled via the sharing API 44 of the sharing manager 70 by the respective sharing agents 14 of the user devices 12 implementing a location sharing application 16.

Figure 2A:
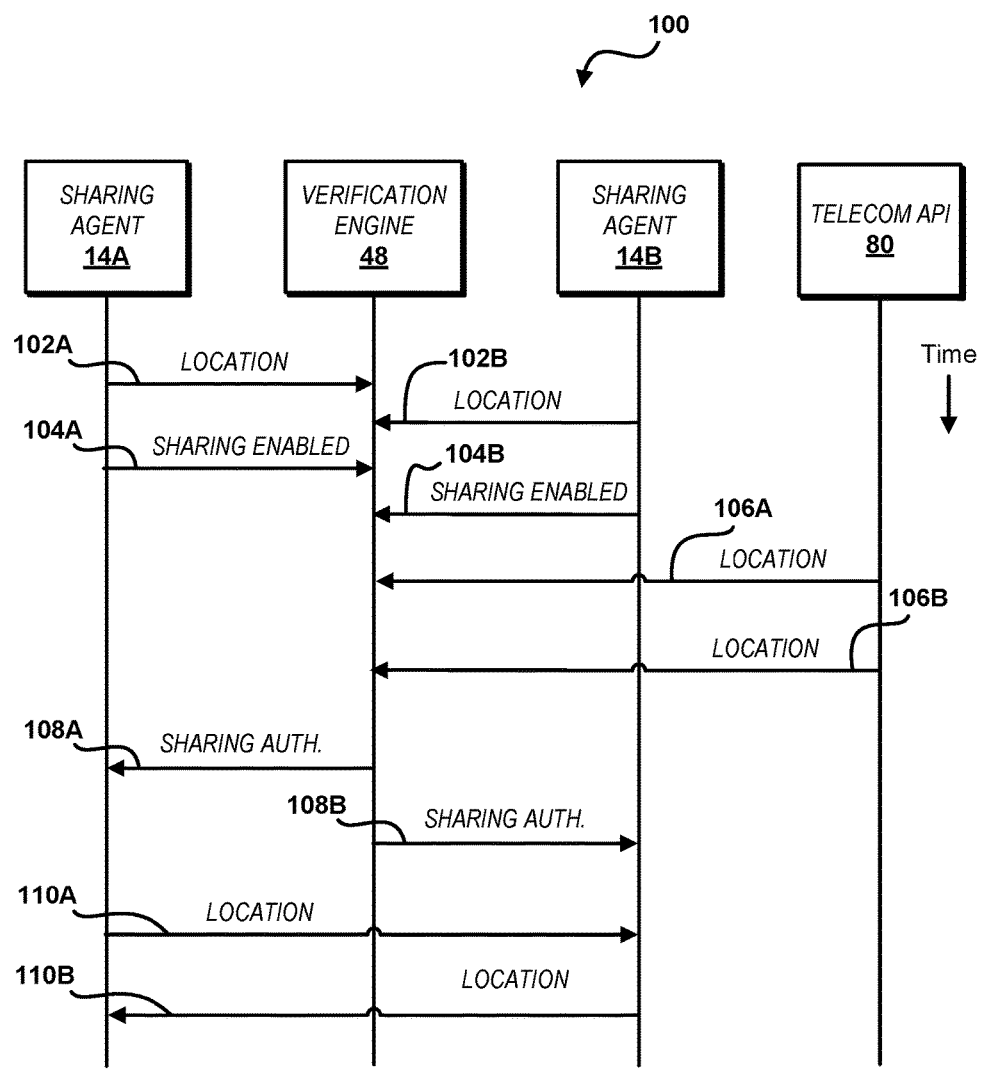
FIGS. 2A and 2B are illustrative communication flows between the user device and the processor-enabled location sharing manager.

Referring to FIG. 2A, a chart is provided showing the communication flow of a location sharing authorization process 100 as performed by elements depicted in FIG. 1. In the process 100 a first sharing agent 14 ("first sharing agent 14A") on a first user device 12 sends its current location information from one or more sources (e.g., GPS location, wireless access point information, and cell tower identifier information) to the verification engine 48 of the sharing manager 70 via the sharing API 44 (communication 102A). A second sharing agent 14 ("second sharing agent 14B") on a second user device 12 sends its current location information to the verification engine 48 (communication 102B). The first sharing agent 14A sends to the verification engine 48 a confirmation that it has enabled sharing with the second sharing agent 14B (communication 104A), and the second sharing agent 14B sends a confirmation that it has enabled sharing with the first sharing agent 14A (communication 104B). The verification engine 48 gathers additional location information of the first user device 12 executing the first sharing agent 14A from the telecom API 80 via the telecom interface 46 (communication 106A). This information can include for example cell tower identifiers of cell towers in communication with the first user device 12. The verification engine 48 further gathers additional location information of the second user device 12 executing the second sharing agent 14B from the telecom API 80 (communication 106B). The verification engine 48 verifies the locations of the first and second user devices 12 based on locations from at least two sources for each user device 12, for example based on two or more of GPS location, wireless access point information, and cell tower identifier information. When the verification engine 48 verifies location information for both user devices 12 and determines sharing is enabled on both user devices 12, sharing authorizations are transmitted to both the first sharing agent 14A and the second sharing agent 14B (communications 108A, 108B). The sharing agents 14A, 14B then enable sharing of location data between them (communications 110A, 110B).

The verification engine 48 can further require that particular target user devices 12 are determined trusted if the particular target user devices 12 are in particular proximity or threshold distance (e.g., within 10k). This may prevent remote alien devices from gaining access to location. The sharing agents 14 are further configured to encrypt location information transmitted between user devices 12. A key generator 56 of the sharing manager 70 generates a key for decrypting the location of a particular user device 12. The key is transmitted to trusted user devices 12 via the sharing API 44 and corresponding sharing agent 14 with permission granted by the user of the particular user device 12. Location for example can be embedded in an encrypted picture by a location sharing application 16 or the sharing agent 14. The decryption key distributed by the share API 44 can include a key shared among a plurality of authorized user devices 12, for example a common key issued to user devices 12 of family members of a user of a particular user device 12 which transmits encrypted location information. Alternatively the decryption key can be a unique private key issued per user device 12, for example a unique key issued to user devices 12 of family members of a user of a particular user device 12 which transmits encrypted location information.

There may be instances when disabling location sharing on a user device 12 may not be desirable or feasible. Disabling location sharing with a particular contact during certain times or at all times may have the unwanted effect of revealing to a contact that a particular user does not want that contact to know the location of the user. Therefore, disabling location sharing in and of itself adversely affects user privacy. The system 10 via the sharing agent 14 enables the sharing of artificial location. Artificial location is generated by the sharing agent 14 of the user device 12 or the route generator 60 of the sharing manager 70, for example generated from machine-learned trajectory models based on aggregated historical trajectories, which trajectory models and aggregated historical trajectories are stored in a route datastore 24 of the user device 12 or a route datastore 54 of the sharing manager 70. The sharing agent 14 or route generator 60 replays a particular trajectory in proper time to simulate a typical, but artificial route, thereby affording a user privacy without cutting off a location stream to one or more other recipients of shared location data. Such replay is useful when location sharing cannot be rejected but is not preferred (e.g., a share request from an annoying friend). Providing a location which is plausible so as not to raise suspicion but entirely inaccurate is preferred. Such location is beneficially generated based on historical trajectories followed by a user and matching with a current time of day, day of week/month/year (e.g., near to home 10 PM on a Sunday), but sufficiently distanced from the user's actual current location (e.g., a local pub).

Timestamped locations of the user device 12 are collected for defining location history. Beneficially, continuous trajectories of the user device 12 with coordinates and timestamps are aggregated by the sharing agent 14 from the LDS 22. A clustering algorithm is applied to the aggregated trajectories to identify clusters of trajectories in time and space. Beneficially, machine learning clustering (e.g., DBSCAN, K-means) is conducted in time and space to identify frequent trajectories (e.g., 8:00 pm-7:00 am at home, 8:00 am-9:00 am from home to office from Mondays through Fridays). Upon enabling by a user of artificial location generation, the sharing agent 14, or alternatively the route generator 60, finds matching clustered trajectories for a current time and selects and replays a particular cluster defining a particular trajectory in close proximity in time to the current time (e.g., time of day, time of week, or time of year). For example, matching clustered trajectories for a time of 7:00 pm on Monday may include trajectories at home or at a library. The location data is transmitted via one or more of the sharing agent 14, location sharing application 16, and the sharing API 44 to one or more other user devices 12, 90 in a sequence and at intervals defined by the timestamps of the particular cluster to create an artificial replay of the particular trajectory. Trajectories for replay are beneficially prioritized based on the distance from the current location of the user device 12 for which artificial location is being shared. For example, a replayed trajectory should be selected which is distanced sufficiently from the current location of the user device 12 to afford user privacy, but not necessarily so far from the current location of the user device 12 that it might invite the scrutiny of a recipient of the artificial location. For example, if the actual current location of the user device 12 is at a basketball court at 7:00 pm on Monday, the sharing agent 14 or route generator 60 can replay a trajectory at or near a particular library sufficiently distanced from the particular basketball court where the user device 12 is located. The route generator beneficially selects connecting artificial trajectories so as to replay a typical day without a sudden jump in location. For example, if the trajectory at or near the particular library is replayed at 7:00 pm, then from 8:00 pm to 9:00 pm a trajectory showing driving from the particular library to home is replayed, and from 9 pm-midnight a trajectory showing the user device 12 at home is replayed.

Figure 6:
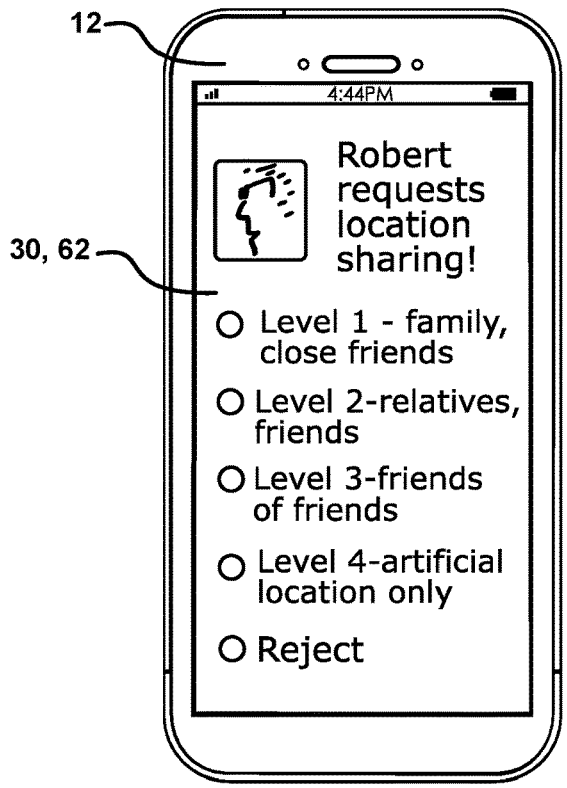
FIGS. 6 and 7 show user devices with exemplary screen displays pursuant to the described location sharing methods.

A user is likely to have a different location privacy sensitivity, or stated otherwise, a different level of willingness to share location information depending on their social relationship with a particular requester or proposed recipient of their location information. For example, a user may be inclined to completely share location information with close family, but the user may be uninclined to share complete and accurate location information with a casual acquaintance or friend. The location sharing applications 16 and the sharing agent 14 enable the receiving of location sharing requests from other user devices 12 or alternatively from other devices 90 which may not execute the sharing agent 14. For example, the sharing agent 14 can receive location sharing requests via the sharing API 44 from the sharing agent 14 on another user device 12, or a location sharing application 16 can receive requests from another user device 12 or another device 90 which does not implement a sharing agent 14. Upon receiving a location sharing request, a user via a user interface 30 is prompted to accept or reject the sharing request, and if accepted, the user is prompted to select a sharing level. Example sharing levels may include: sharing level 1 (e.g., immediate family, very close friends), level 2 (e.g., relatives, friends), level 3 (e.g., friends of friends, $3^{rd}$ parties), level 4 (e.g., black list, reject future sharing requests or always send artificial location). FIG. 6 shows a user device 12 implementing a display 62 on the user interface 30 enabling a user to select a sharing level responsive to a sharing request from a contact via a location sharing application 16.

Figure 7:
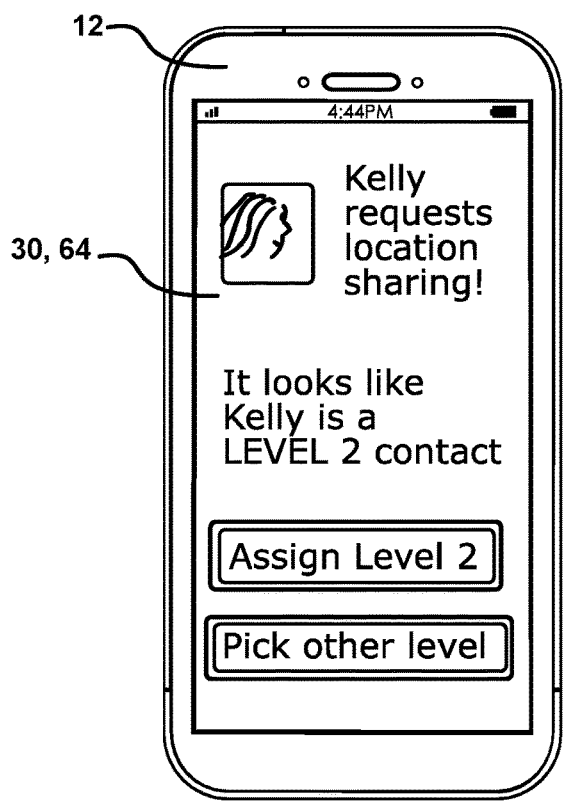

A location sharing predictor 58 of the sharing manager 70 is configured to automatically designate or suggest a location sharing level between a particular user of the sharing agent 14 and a particular target (e.g., a contact of the particular user) can be determined based on historical location sharing level designations of other targets as designated by the user or designated automatically via the location sharing predictor 58. The location sharing level of the particular target can further be based on historical phone call frequency and duration, electronic messaging frequency and duration, sentiment analysis of phone calls and messages, and proximate location occurrences between the particular user and the particular target, or between the particular user and one or more other contacts with some association to the particular target (e.g., similar location, similar age, or similar occupation as the particular target). The location sharing predictor 58 can enable suggestions to a user via the sharing agent 14 and user interface 30 indicating a proposed sharing level of a particular target. The proposed sharing level can be provided to the user upon receiving a location sharing request from a target, upon identifying by a user a target to whom location will be shared, or periodically (e.g., monthly), for example based on the user's current sharing patterns, current location patterns, and current communication patterns. FIG. 7 shows a user device 12 implementing a display 64 on the user interface 30 enabling a user to confirm selection of an automatically determined sharing level responsive to a sharing request from a contact via a location sharing application 16.

Automatic designation or suggestion of a location sharing level enables what would otherwise be impractical, especially where hundreds or thousands of user contacts must be categorized. The location sharing predictor 58 beneficially builds a global machine learning model for example a decision tree or deep neural network ("DNN") model. The location sharing predictor 58 collects via the sharing agent 14 global training data with associated activity data (e.g., # of phone calls/messages, sentiment analysis over conversation, location proximity) for target contacts with known location sharing levels (e.g., selected by a user via the user interface 30). The training data can be collected from a communications and contacts datastore 32 or in real-time through the user interface 30, the wireless hardware 20, or other accessible interface. Frequent and longer duration of phone calls or messages (e.g., five phone calls per day) with a particular contact or proximate location occurrences with a particular contact (e.g., 25% of time within 100 meters distance of the particular contact) for example indicates a close relationship. Machine learning sentiment analysis by the sharing agent 14 or the location sharing predictor 58 on voice communication audio clips and electronic messages indicates positive/negative sentiment of relationships. The location sharing predictor 58 trains a global model based on global training data aggregated from a plurality of user devices 12 from which a local model is trained by the sharing agent 14 on a particular user device 12.

Figure 2B:
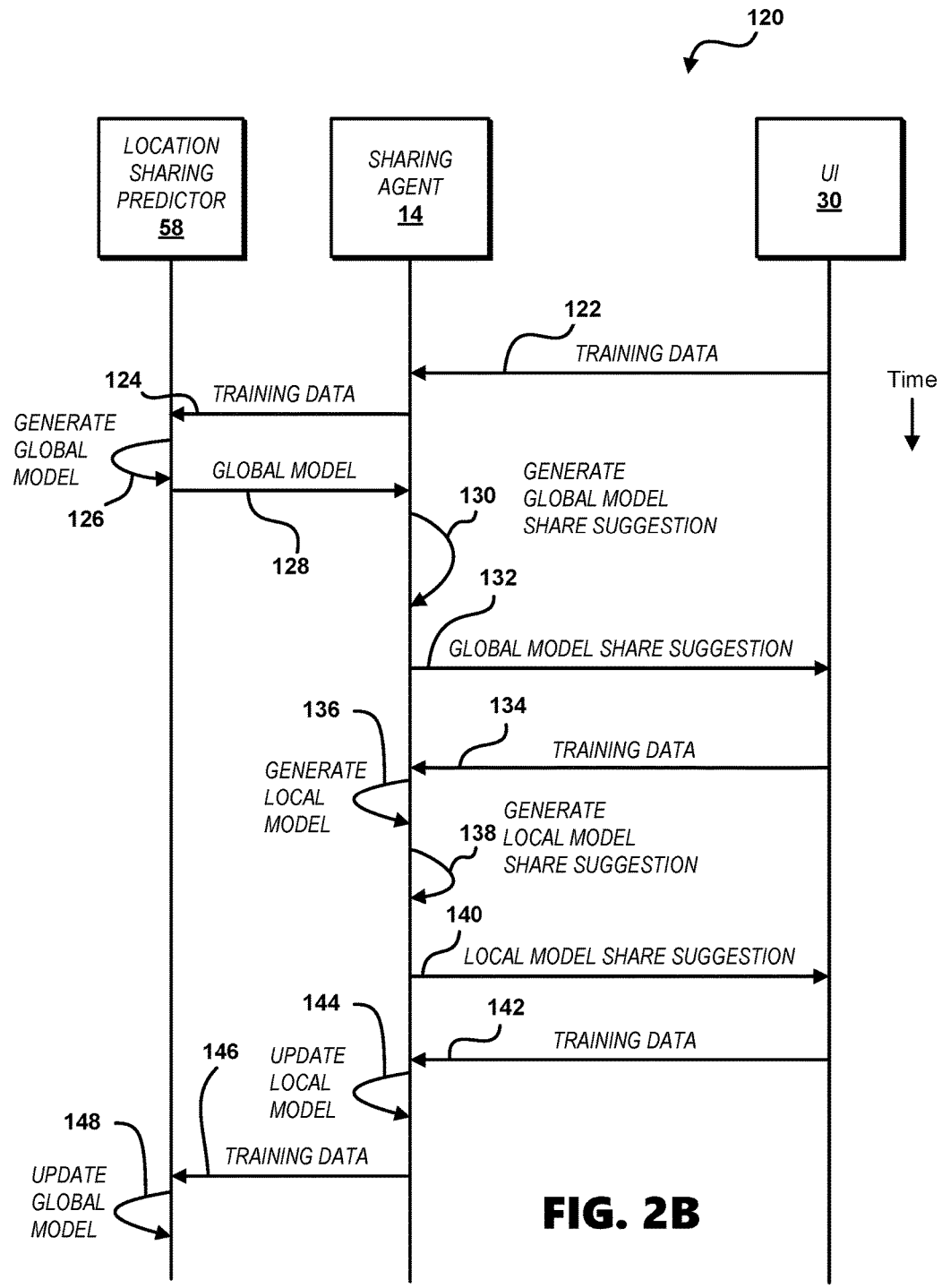

Referring to FIG. 2B, a chart is provided showing the communication flow of a sharing model training process 120 as performed by elements depicted in FIG. 1. Training data is received by the sharing agent 14 via a user interface 30 based on user inputs (communication 122), for example query responses of the type described herein with reference to FIGS. 6 and 7. The training data from a plurality of user devices 12 is transmitted to the location sharing predictor 58 (communication 124) via the sharing API 44, which training data is used in generating a global model (step 126). The global model is transmitted to the sharing agent 14 (communication 128), beneficially via download through the sharing API 44. The sharing agent 14 uses the global model to generate a share suggestion (step 130) which is transmitted to the user interface 30 (communication 132), for example a share suggestion of the type described herein with reference to FIG. 7. Beneficially, a share suggestion, for example a suggested location sharing level, is provided for each contact stored on the user device 12 in the communications and contacts datastore 32. Training data incorporating a user's response to the share suggestion (e.g., acceptance of a share level suggestion or rejection by a user of the share suggestion and selection by the user of another share level) is transmitted to the sharing agent 14 from the user interface 30 (communication 134), and the sharing agent 14 generates a local model (step 136) based on the global model and the training data received from the user interface 30 on the user device 12. The local model is therefore personalized to account for the sharing preferences of the user of the particular user device 12. The sharing agent 14 generates a share suggestion based on the local model (step 138) and transmits the share suggestion to the user interface 30 (communication 140), for example a share suggestion of the type described herein with reference to FIG. 7. Training data is transmitted to the sharing agent 14 (communication 142) based on a user's response to the share suggestion in communication 140, which training data is used to update the local model (step 144) Also, this training data along with data from other user devices 12 is transmitted to the location sharing predictor 58 via the sharing API 44 (communication 146) and is used by the location sharing predictor 58 to update the global model (step 148). Communications 140, 142, 146 and steps 144, 148 are repeated periodically to further model refinements and to adapt to changes in relationships.

Figure 3:
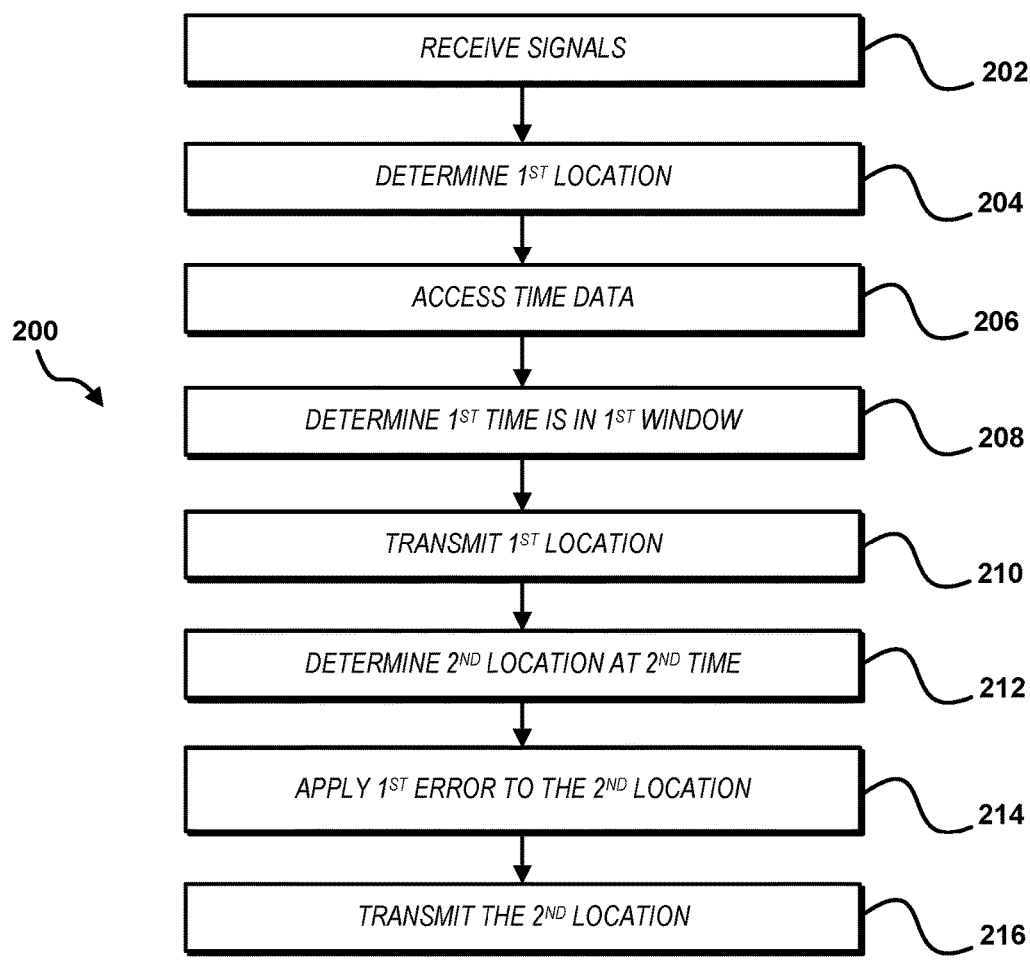
FIGS. 3-5 are flowcharts showing particular electronic messaging methods according to the illustrative embodiments.

Referring to FIG. 3, a flowchart shows a method 200 performed by a user device 12 via a processor. While the method 200 and associated processes are described with reference to the components shown in FIG. 1, including the user device 12 and the network-accessible processor-enabled location sharing manager 70, the method 200 may alternatively be performed via other suitable systems.

The method 200 includes receiving signals by a mobile device such as smartphone or table computer, for example configured as the user device 12 (step 202). The mobile device determines a first location of the mobile device at a first time based on the signals received by the mobile device (step 204). Determining the location can include for example determining the first location is positioned along a particular route. Location is determined for example based on signals received by an LDS 22 including GPS hardware which enables the determining of location. The mobile device accesses time data (step 206) and determines based on the time data that the first time is in a first time window (step 208). For example a sharing agent 14 enabled by a processor of the user device 12 can access time data from the clock 26. The first location is transmitted to a particular user device, also beneficially configured as a user device 12, at least responsive to the first time being in the first time window (step 210). The first location can be transmitted further responsive to the first location being positioned along a particular route at the first time. The mobile device determines a second location at a second time based on the signals received by the mobile device (step 212). A first error is applied to the second location (step 214) at least responsive to the determining of the second location at the second time, and the second location is transmitted including the first error to the particular user device (step 216). Determining the second location can include determining that the second location is positioned outside a particular area or inside a particular area, and the first error can be applied responsive at least to the second location being positioned outside or inside the particular area. The first error can be applied for example to the second location responsive to the second time being determined by the mobile device to be in a second time window. The first location and the second location can be transmitted for example by a user device 12 to another user device 12 or other device 90 via the sharing API 44 of the sharing manager 70 or via a location sharing application 16 and the message forwarding center 82.

The method 200 can also include determining by the mobile device a third location at a third time based on the signals received by the mobile device, determining by the mobile device that the third location is positioned inside a particular area, and applying a second error to the third location responsive to the third location being positioned inside the particular area, the second error being greater in magnitude than the first error. The third location including the second error is transmitted to the particular user device. Alternatively, the method 200 can further include determining by the mobile device a third location at a third time based on the signals received by the mobile device, determining by the mobile device based on the time data that the third time is in a third time window, applying a second error to the third location responsive to the third time being in the third time window, the second error being greater in magnitude than the first error, and transmitting the third location including the second error to the particular user device.

Figure 4:
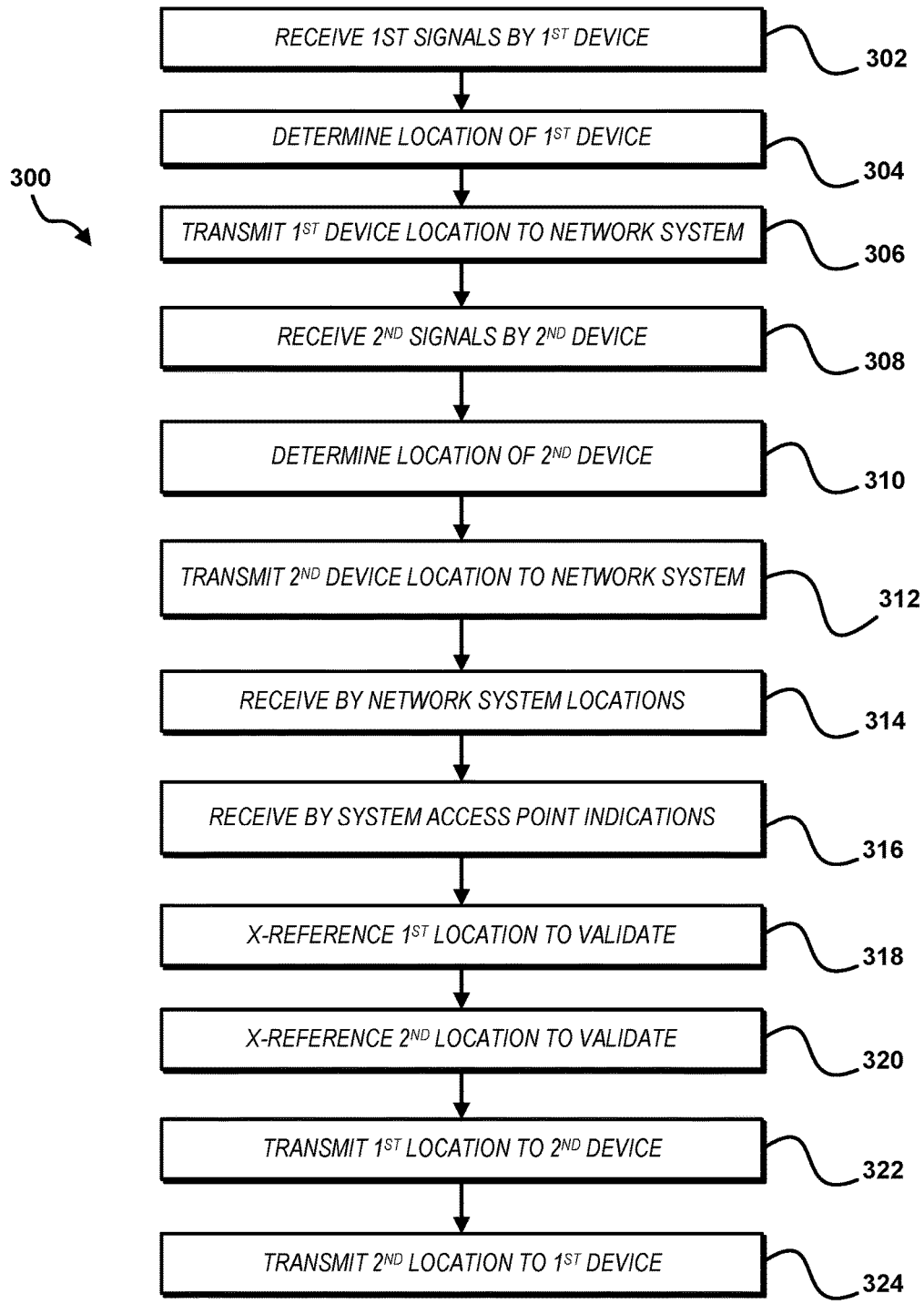

Referring to FIG. 4, a flowchart shows a method 300 performed by a user device 12 via a processor. While the method 300 and associated processes are described with reference to the components shown in FIG. 1, including the user device 12 and the network-accessible processor-enabled location sharing manager 70, the method 300 may alternatively be performed via other suitable systems.

The method 300 includes receiving first signals by a first mobile device configured as a user device 12 (step 302). A location of the first mobile device is determined by the first mobile device based on the first signals received by the first mobile device (step 304). The location of the first mobile device is transmitted by the first mobile device to a computing system via a network, for example a computing system enabling the sharing manager 70 via the communications network 8 (step 306). Second signals are received by a second mobile device configured as another user device 12 (step 308). The second mobile device determines a location of the second mobile device based on the second signals received by the second mobile device (step 310). The second mobile device transmits the location of the second mobile device to the computing system via the network (step 312). The computing system receives the location of the first mobile device and the location of the second mobile device (step 314). The computing system receives from one or more of the first mobile device, the second mobile device, or a third party system an indication of a first access point connected to the first mobile device and a second access point connected to the second mobile device (step 316). The access points can be determined for example by wireless hardware 20 and can include cell tower identification, wireless router identification, or other identifiable signal source. The third party system can include for example the telecom API 80 which provides an indication of cellular towers which connect to a user device 12. The location of the first mobile device is cross-referenced with the indication of the first access point to validate the location of the first mobile device (step 318), and the location of the second mobile device is cross-referenced with the indication of the second access point to validate the location of the second mobile device (step 320). The cross-referencing is performed for example by the verification engine 48 of the sharing manager 70. The location of the first mobile device is transmitted to the second mobile device at least based on the validation of the location of the second mobile device (step 322), and the location of the second mobile device is transmitted to the first mobile device at least based on the validation of the location of the first mobile device (step 324). The first location and the second location can be transmitted for example by a user device 12 to another user device 12 via the sharing API 44 of the sharing manager 70 or via a location sharing application 16 and message forwarding center 82.

The method 300 can also include comparing the location of the first mobile device and the location of the second mobile device, transmitting the location of the first mobile device to the second mobile device further based on the comparing of the location of the first mobile device and the location of the second mobile device, and transmitting the location of the second mobile device to the first mobile device further based on the comparing of the location of the first mobile device and the location of the second mobile device. For example, location can be transmitted only when the mobile devices are within a threshold distance of the other. Further, the method 300 can include transmitting the location of the first mobile device in a first encrypted communication and transmitting the location of the second mobile device in a second encrypted communication. The first mobile device is provided with a first key and the second mobile device provided with a second key. The second mobile device decrypts the first encrypted communication using the first key, and the first mobile device decrypts the second encrypted communication using the second key.

Figure 5:
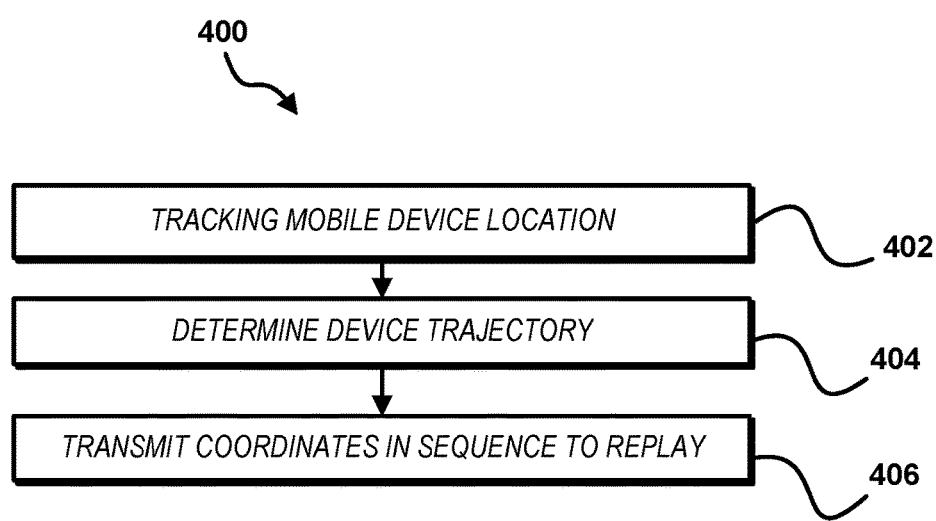

Referring to FIG. 5, a flowchart shows a method 400 performed by a user device 12 via a processor. While the method 400 and associated processes are described with reference to the components shown in FIG. 1, including the user device 12 and the network-accessible processor-enabled location sharing manager 70, the method 400 may alternatively be performed via other suitable systems.

The method 400 includes tracking location of a mobile device, configured as a user device 12, over a particular time period (step 402). The tracking beneficially includes tracking the location of the mobile device over the particular time period on at least a first day at a particular time of day. A particular trajectory is determined based on the tracking of the mobile device location, the particular trajectory comprising geographic coordinates and timestamps of the geographic coordinates (step 404). It is beneficially determined that the particular trajectory corresponds to the particular time of day. The geographic coordinates of the particular trajectory are transmitted in sequence and at intervals defined by the timestamps to create an artificial replay of the particular trajectory (step 406). The geographic coordinates can be transmitted for example on a second day at the particular time of day.

The method 400 can also include determining a current location or a current trajectory of the mobile device, comparing the current location or the current trajectory and the particular trajectory, and transmitting the coordinates of the particular trajectory to the particular device based on a distance of the current location or the current trajectory from the particular trajectory. For example, the coordinates of the particular trajectory are transmitted if the current location or current trajectory of the mobile device is sufficiently distanced away from the particular trajectory. Further, the method 400 can include transmitting the coordinates of the particular trajectory to the particular device based on the distance of the current location or the current trajectory from the particular trajectory exceeding a particular threshold.

Figure 8:
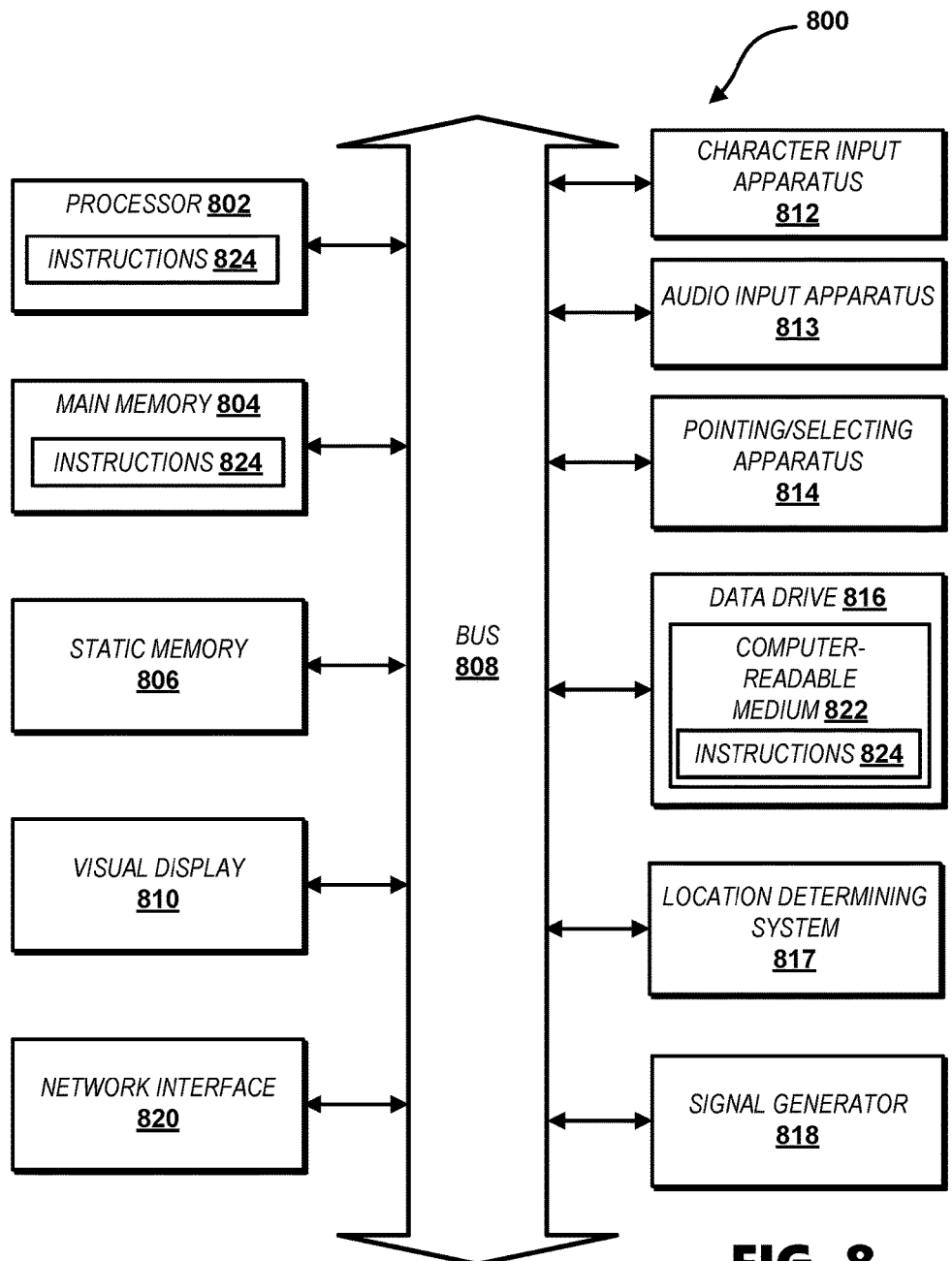
FIG. 8 is an illustrative computer system for performing the described location sharing methods according to the illustrative embodiments.

FIG. 8 illustrates in abstract the function of an exemplary computer system 800 on which the systems, methods and processes described herein can execute. For example, the user device 12, location sharing manager 70, and message forwarding center 82 can each be embodied by a particular computer system 800. The computer system 800 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 824 executable by the computer system 800.

The computer system 800 can operate as a standalone device or can be connected (e.g., networked) to other machines. In a networked deployment, the computer system 800 may operate in the capacity of a server or a client machine in server-client network environment, or as a peer machine in a peer-to-peer (or distributed) network environment. The computer system 800 can also be considered to include a collection of machines that individually or jointly execute a set (or multiple sets) of instructions to perform one or more of the methodologies described herein.

It would be understood by those skilled in the art that other computer systems including but not limited to network personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 800 includes a processor 802, for example a central processing unit (CPU) or a graphics processing unit (GPU), a main memory 804, and a static memory 806 in communication via a bus 808. A visual display 810 for example a liquid crystal display (LCD), light emitting diode (LED) display or a cathode ray tube (CRT) is provided for displaying data to a user of the system. The visual display 810 can be enabled to receive data input from a user for example via a resistive or capacitive touch screen. A character input apparatus 812 can be provided for example in the form of a physical keyboard, or alternatively, a program module which enables a user interactive simulated keyboard on the visual display 810 and actuatable for example using a resistive or capacitive touchscreen. An audio input apparatus 813 for example a microphone enables audible language input which can be converted to textual input by the processor 802 via the instructions 824. A pointing/selecting apparatus 814 can be provided, for example in the form of a computer mouse or enabled via a resistive or capacitive touch screen in the visual display 810. A data drive 816, a signal generator 818 such as an audio speaker, and a network interface 820 can also be provided. A location determining system 817 is also provided which can include for example a GPS receiver and supporting hardware.

The instructions 824 and data structures embodying or used by the herein-described systems, methods, and processes, for example software instructions, are stored on computer-readable medium 822 and are accessible via the data drive 816. Further, the instructions 824 can completely or partially reside for a particular time period in the main memory 804 or within the processor 802 when the instructions 824 are executed. The main memory 804 and the processor 802 are also as such considered computer-readable media.

While the computer-readable medium 822 is shown as a single medium, the computer-readable medium 822 can be considered to include a single medium or multiple media, for example in a centralized or distributed database, or associated caches and servers, that store the instructions 824. The computer-readable medium 822 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, and CD-ROM and DVD-ROM disks, Erasable Programmable Read-Only Memory (EPROM), Electrically Erasable Programmable Read-Only Memory (EEPROM), and flash memory devices).

The instructions 824 can be transmitted or received over a communications network, for example the communications network 8, using a signal transmission medium via the network interface 820 operating under one or more known transfer protocols for example, FTP, HTTP, or HTTPs. Examples of communication networks include a local area network (LAN), a wide area network (WAN), the Internet, mobile telephone networks, Plain Old Telephone (POTS) networks, and wireless data networks for example, WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for sharing mobile device location information, the method comprising:
   receiving signals by a mobile device;
   determining by the mobile device a first location of the mobile device at a first time based on the signals received by the mobile device;
   accessing time data by the mobile device;
   determining by the mobile device based on the time data that the first time is in a first time window;
   transmitting the first location to a particular user device at least responsive to the first time being in the first time window;
   determining by the mobile device a second location of the mobile device at a second time based on the signals received by the mobile device;
   applying a first error to the second location at least responsive to the determining of the second location at the second time;
   transmitting the second location including the first error to the particular user device;
   determining by the mobile device a third location of the mobile device at a third time based on the signals received by the mobile device;
   determining by the mobile device based on the time data that the third time is in a third time window;
   applying a second error to the third location at least responsive to the third time being in the third time window, the second error being greater in magnitude than the first error; and
   transmitting the third location including the second error to the particular user device.

2. The method of claim 1, further comprising:
   determining by the mobile device that the first location is positioned along a particular route; and
   transmitting the first location to the particular user device further responsive to the first location being positioned along the particular route at the first time.

3. The method of claim 1, further comprising:
   determining by the mobile device that the second location is positioned outside a particular area; and
   applying the first error to the second location responsive at least to the second location being positioned outside the particular area.

4. The method of claim 1, further comprising:
   determining by the mobile device based on the time data that the second time is in a second time window; and
   applying the first error to the second location responsive to the second time being in the second time window.

5. The method of claim 4, further comprising:
   determining by the mobile device that the second location is positioned outside a particular area; and
   applying the first error to the second location further responsive to the second location being positioned outside the particular area.

6. The method of claim 4, further comprising:
   determining by the mobile device that the second location is positioned inside a particular area; and applying the first error to the second location further responsive to the second location being positioned inside the particular area.

7. A method for sharing mobile device location information, the method comprising:
receiving signals by a mobile device;
determining by the mobile device a first location of the mobile device at a first time based on the signals received by the mobile device;
accessing time data by the mobile device;
determining by the mobile device based on the time data that the first time is in a first time window;
transmitting the first location to a particular user device at least responsive to the first time being in the first time window;
determining by the mobile device a second location of the mobile device at a second time based on the signals received by the mobile device;
applying a first error to the second location at least responsive to the determining of the second location at the second time;
transmitting the second location including the first error to the particular user device;
determining by the mobile device a third location of the mobile device at a third time based on the signals received by the mobile device;
determining by the mobile device that the third location is positioned inside a particular area;
applying a second error to the third location at least responsive to the third location being positioned inside the particular area, the second error being greater in magnitude than the first error; and
transmitting the third location including the second error to the particular user device.

8. The method of claim 7, further comprising:
determining by the mobile device that the first location is positioned along a particular route; and
transmitting the first location to the particular user device further responsive to the first location being positioned along the particular route at the first time.

9. The method of claim 7, further comprising:
determining by the mobile device that the second location is positioned outside the particular area; and
applying the first error to the second location responsive at least to the second location being positioned outside the particular area.

10. The method of claim 7, further comprising
determining by the mobile device based on the time data that the second time is in a second time window; and
applying the first error to the second location responsive to the second time being in the second time window.

11. The method of claim 10, further comprising:
determining by the mobile device that the second location is positioned outside the particular area; and
applying the first error to the second location further responsive to the second location being positioned outside the particular area.

12. The method of claim 10, further comprising:
determining by the mobile device that the second location is positioned inside the particular area; and
applying the first error to the second location further responsive to the second location being positioned inside the particular area.

13. A network-connectable mobile device comprising at least one non-transitory computer readable storage medium and at least one processor, the at least one non-transitory computer readable storage medium having encoded thereon instructions that, when executed by the at least one processor, cause the mobile device to perform a process comprising:
receiving signals;
determining a first location of the mobile device at a first time based on the signals received;
accessing time data;
determining based on the time data that the first time is in a first time window;
transmitting the first location to a particular user device at least responsive to the first time being in the first time window;
determining a second location of the mobile device at a second time based on the signals received;
applying a first error to the second location at least responsive to the determining of the second location at the second time;
transmitting the second location including the first error to the particular user device;
determining a third location at a third time based on the signals received by the mobile device;
determining based on the time data that the third time is in a third time window;
applying a second error to the third location at least responsive to the third time being in the third time window, the second error being greater in magnitude than the first error; and
transmitting the third location including the second error to the particular user device.

* * * * *